Patented Sept. 1, 1936

2,052,902

UNITED STATES PATENT OFFICE 2,052,902

PROCESS FOR PREPARING DESICCATED MILK OF MAGNESIA AND PRODUCT RESULTING THEREFROM

Sol Snyder, Edgemere, N. Y.

No Drawing. Application January 15, 1934, Serial No. 706,665

5 Claims. (Cl. 167—56)

This invention relates to a process for preparing colloidal magnesium hydroxide and the product resulting therefrom. It deals with the treatment of the aqueous suspension of magnesium hydroxide commonly known as magma magnesia or milk of magnesia, so as to render it substantially anhydrous and yet retain the colloidal properties of the original magma magnesia. The product resulting from this treatment, when added to the proper amount of water regenerates a suspension of magnesium hydroxide having essentially the same colloidal properties as the original magma magnesia.

Magma magnesia as commonly prepared is an aqueous suspension of the washed precipitate resulting from the action of an alkali on a magnesium salt. When thus prepared the suspension exhibits definite colloidal properties such as a high viscosity, relative little tendency for the precipitate to settle out and if the concentration of this colloidal magnesium hydroxide is too high the suspension no longer remains a liquid, but a solid gel is formed. If this colloidal suspension of magnesium hydroxide is dried by the evaporation of the water as, for instance, by heating over a hot water bath and the resulting anhydrous material ground to a fine powder and then suspended in water, it will be found that this suspension will have none of the colloidal properties associated with the original magma magnesia. The viscosity of this suspension is not materially greater than the water itself, it settles out rapidly and the colloidal properties which are so essential to the therapeutic properties of the original magma magnesia are utterly destroyed.

I have found that by the addition of highly colloidal clays of the type of bentonite to the magma magnesia before drying I am able to conserve the colloidal properties of the magma magnesia on subsequent drying.

This process may best be illustrated by an example of which the following is typical: A smooth homogeneous suspension of bentonite clay is made with water. This suspension is added to the magma magnesia in the proportion of 1 part of bentonite to 3 parts of magnesium hydroxide contained in the magma magnesia. The water is now evaporated off, by any of the usual methods; the only precaution taken is to keep the temperature below the point where magnesium hydroxide forms magnesium oxide. This mixture dries readily and when dry it is readily powdered. Suitable flavoring agents such as oil of peppermint may be added to increase its palatability and it may be stamped into tablets or wafers. When this dry material is brought into contact with the correct volume of water it forms a colloidal suspension having the high viscosity and non-settling properties akin to the original magma magnesia. I have also found that the bentonite clay exerts a protective action on the magnesium hydroxide by tending to prevent the formation of magnesium carbonate when the material is exposed to air.

The details of the above process are not to be considered as limiting this invention, but various changes and proportions may be made without departing from the scope of this patent. The various commercially obtainable bentonite clays vary as to their colloidal properties and I have found that the optimum proportions may vary between 2 parts by weight of bentonite to 1 part by weight of magnesium hydroxide contained in the magma magnesia to 1 part by weight of bentonite to 6 parts by weight of magnesium hydroxide contained in the magma magnesia. Instead of adding an aqueous suspension of the bentonite clay to the magma magnesia the dry powdered bentonite may be added directly and stirred until a homogeneous suspension results. Under certain conditions it might be found cheaper to filter off and press out the excess water from the magma magnesia-bentonite suspension before evaporating it to dryness.

If amounts of bentonite are used below the optimum proportions given above, the colloidal properties of the magma magnesia are partially retained, for instance, 1 part by weight of bentonite to 20 parts by weight of magnesium hydroxide contained in the magma magnesia shows a decided superiority over the untreated dried magnesium hydroxide.

What I claim is:

1. The process of making desiccated magma magnesia which comprises mixing an aqueous suspension of bentonite clay with magma magnesia and drying the resulting mixture, the bentonite clay being present in sufficient quantity to preserve the colloidal form of the magma magnesia on drying.

2. As a new product of manufacture, a substantially anhydrous combination of colloidal magnesium hydroxide and bentonite clay, said bentonite clay being present in sufficient quantity to preserve the colloidal nature of said magnesium hydroxide.

3. The process of making desiccated magma magnesia which comprises mixing an aqueous suspension of bentonite clay with magma magnesia and drying the resulting mixture, the bentonite clay present being from 15 to 200% of the weight of the magnesium hydroxide contained in said magma magnesia.

4. The process of preparing desiccated magma magnesia which consists in mixing bentonite clay and magma magnesia, to form a homogeneous mass and in then drying this mixture, the bentonite clay being present in sufficient quantity to preserve the colloidal form of the magma magnesia on drying.

5. As a new product of manufacture a substantially anhydrous combination of colloidal magnesium hydroxide and bentonite clay, the percentage of bentonite clay present being from 15 to 200% of the weight of the magnesium hydroxide.

SOL SNYDER.